United States Patent
Saeki

(10) Patent No.: US 10,481,671 B2
(45) Date of Patent: Nov. 19, 2019

(54) POWER SAVING FOR A COMPUTER SYSTEM AND COMPUTER BASED ON DIFFERENCES BETWEEN CHIP REGIONS IN PROCESSING AND COMMUNICATION TIMES

(71) Applicant: Hitachi, Ltd., Tokyo (JP)

(72) Inventor: Yuji Saeki, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 190 days.

(21) Appl. No.: 15/544,027

(22) PCT Filed: May 21, 2015

(86) PCT No.: PCT/JP2015/064590
§ 371 (c)(1),
(2) Date: Jul. 17, 2017

(87) PCT Pub. No.: WO2016/185599
PCT Pub. Date: Nov. 24, 2016

(65) Prior Publication Data
US 2017/0371395 A1    Dec. 28, 2017

(51) Int. Cl.
*G06F 1/32* (2019.01)
*G06F 1/3234* (2019.01)
(Continued)

(52) U.S. Cl.
CPC ............ *G06F 1/3234* (2013.01); *G06F 1/324* (2013.01); *G06F 1/3206* (2013.01);
(Continued)

(58) Field of Classification Search
None
See application file for complete search history.

(56) References Cited

U.S. PATENT DOCUMENTS

2007/0070673 A1    3/2007 Borkar et al.
2010/0115304 A1*   5/2010 Finkelstein ............. G06F 1/206
                                                                    713/320
(Continued)

FOREIGN PATENT DOCUMENTS

JP    2006-344162 A    12/2006
JP    2010-211544 A     9/2010
(Continued)

OTHER PUBLICATIONS

Translation of Written Opinion of the International Searching Authority received in corresponding International Application No. PCT/JP2015/064590 dated Jun. 23, 2015.
(Continued)

*Primary Examiner* — Danny Chan
(74) *Attorney, Agent, or Firm* — Mattingly & Malur, PC

(57) ABSTRACT

A computer system, comprising a plurality of computers, each of the plurality of computers including at least one processor chip each including a plurality of processor cores, the at least one processor chip constructing a plurality of regions each constructed by at least one processor core, each of the plurality of processor cores carries out calculation processing for executing a predetermined program and inter-core communication processing, which is communication between the plurality of processor cores, the computer system comprising: a regulation module which controls a voltage and a frequency that are supplied to each of the plurality of regions; and a determination module which determines a power mode of each of the plurality of regions, to output an instruction to the regulation module.

13 Claims, 11 Drawing Sheets

(51) Int. Cl.
  *G06F 15/173* (2006.01)
  *G06F 15/177* (2006.01)
  *G06F 1/3206* (2019.01)
  *G06F 1/324* (2019.01)
  *G06F 1/3296* (2019.01)
  *G06F 1/3287* (2019.01)

(52) U.S. Cl.
  CPC .......... *G06F 1/3287* (2013.01); *G06F 1/3296* (2013.01); *G06F 15/173* (2013.01); *G06F 15/177* (2013.01); *G06F 15/17318* (2013.01); *G06F 15/17381* (2013.01); *G06F 15/1735* (2013.01)

(56) References Cited

U.S. PATENT DOCUMENTS

| | | | | |
|---|---|---|---|---|
| 2011/0010481 A1* | 1/2011 | Hamadani | ........... | G06F 13/4022 710/313 |
| 2012/0166845 A1* | 6/2012 | Henry | ................... | G06F 1/3206 713/323 |
| 2013/0159741 A1* | 6/2013 | Schluessler | ........... | G06F 1/3253 713/320 |
| 2014/0237267 A1 | 8/2014 | Wang et al. | | |
| 2014/0259160 A1* | 9/2014 | Rouvinen | ............. | G06F 21/554 726/22 |
| 2016/0092363 A1* | 3/2016 | Wang | ................... | G06F 11/3409 711/119 |

FOREIGN PATENT DOCUMENTS

| | | |
|---|---|---|
| JP | 2012-038347 A | 2/2012 |
| JP | 2014-157601 A | 8/2014 |
| JP | 2014-197284 A | 10/2014 |

OTHER PUBLICATIONS

Translation of International Search Report of PCT/JP2015/064590 dated Jun. 23, 2015.

* cited by examiner

```
#!/bin/sh
export PATH=/usr/mpi/bin:$PATH
export LD_LIBRARY_PATH=/usr/mpi/lib:$LD_LIBRARY_PATH
export JOB_CALC_LOAD=A
export JOB_COM_DATA=C
cd /work
mpirun -n XXX -hostfile YYY ./prog
```

POWER SAVING FOR A COMPUTER SYSTEM AND COMPUTER BASED ON DIFFERENCES BETWEEN CHIP REGIONS IN PROCESSING AND COMMUNICATION TIMES

BACKGROUND OF THE INVENTION

This invention relates to a power saving technology for a computer system including a many-core processor chip.

Parallel computer systems including several hundred thousand to several millions of processor cores coupled to one another have been developed in order to perform large-scale scientific and technological simulations. In the parallel computer systems in recent years, a many-core processor chip in which several thousands of processor cores of the same type that are simplified in structure are implemented by virtue of an increase in the degree of integration is used. A representative configuration thereof is constructed by a group of computing nodes including a sub-system of a many-core processor chip and a high-speed network adaptor. The many-core processor chip is coupled to a general-purpose CPU chip and a main storage apparatus via the PCI Express as an input/output device and includes an independent memory, and a high-speed network adaptor.

In a large-scale system coupling some tens of thousands of computing nodes to one another, an overall power consumption is more than 10 megawatts, and a mechanism for suppressing the power is thus necessary. Moreover, when all the cores operate under high loads in a single processor chip, the power and the temperature exceed design upper limits, and a calculation speed thus needs to be adjusted.

Thus, there is known power control using a power saving function for carrying out power consumption management on a core-by-core basis (for example, refer to JP 2012-038347 A and JP 2010-211544 A).

In JP 2012-038347 A, there is a description: "Each VR may supply power to a core or a part of a core. Different VRs may provide multiple voltages to a core/part in a many-core processor. The value of the output voltage of a VR may be modulated under the direction of the core/part to which the voltage regulator supplies power. In one embodiment, the multiple VRs may be integrated with cores in a single die. In another embodiment, the power management system with multiple VRs may be on a die ("the VR die") separate from the die of the many-core processor. The VR die may be included in the same package as the many-core processor die." As a result, power control can be carried out in accordance with a calculation amount assigned to each core.

Moreover, in JP 2010-211544 A, there is a description: "there is provided a multi-core processor including: a plurality of processor cores; a register configured to store an identification number of a first task group for tasks, a task processing period, and an upper limit period for carrying out a task included in the first task group; a setting circuit configured to extract a second task group including a plurality of tasks processed in parallel out of the tasks included in the first task group, and to set a first processing period for processing the second task group as a second processing period in accordance with power consumption of the processor core for processing the second task group; and a drive circuit configured to change, in accordance with a ratio between the task processing period and the second processing period, a frequency of an operation clock or a power supply voltage supplied to the processor core for processing each task."

SUMMARY OF THE INVENTION

When the related-art power control for adjusting the power supply voltage and the operation frequency based on the load information on the task assigned to each core is applied in the many-core processor chip, arrangement of a regulator configured to control the voltage and the frequency and selection of a power mode of each core are difficult.

Moreover, in a large-scale scientific and technological simulation, in general, data subjected to calculation is evenly divided and the divided pieces of data are assigned to all the cores, and those pieces of data are processed by using the same program. In this case, the calculation load on each core is even, and hence power control does not need to be carried out on a core-by-core basis. However, one program is less likely to exclusively use the entire parallel computer system, and hence loads on groups of processor chips each being used by one program are not even. Thus, there is a problem in power management for the entire system.

Meanwhile, in a case of a parallel computer constructed by mutually coupling many-core processor chips to one another, there is such a problem that there is a great difference between communication performance between the cores inside the same chip and communication performance between the different chips. Thus, for example, such devise that inter-chip communication and calculation are simultaneously carried out by changing algorithm or a calculation sequence is necessary.

This invention has an object to increase power efficiency of a many-core processor chip through power control for processor cores in the many-core processor chip.

The present invention can be appreciated by the description which follows in conjunction with the following figures, wherein: a computer system, comprising a plurality of computers, each of the plurality of computers including at least one processor chip each including a plurality of processor cores. The at least one processor chip constructs a plurality of regions each constructed by at least one processor core. Each of the plurality of processor cores is configured to carry out calculation processing for executing a predetermined program and inter-core communication processing, which is communication between the plurality of processor cores. The computer system comprises: a regulation module configured to control a voltage and a frequency that are supplied to each of the plurality of regions; and a determination module configured to determine a power mode, which is a combination of the voltage and the frequency that are supplied to each of the plurality of regions, to output an instruction to the regulation module. The determination module being configured to determine the power mode of each of the plurality of regions based on a calculation amount of the calculation processing and a communication data amount of the inter-core communication processing in the at least one processor core included in the each of the plurality of regions.

According to this invention, in the processor chip divided into the plurality of regions, a wait period of the processing of each processor core is decreased by adjusting the power mode of each region, thereby increasing the power efficiency of the processor chip. Problems, configurations, and effects other than described above will become apparent from a description of an embodiment below.

BRIEF DESCRIPTION OF THE DRAWINGS

The present invention can be appreciated by the description which follows in conjunction with the following figures, wherein.

DETAILED DESCRIPTION OF THE PREFERRED EMBODIMENTS

First Embodiment

Figure 1:
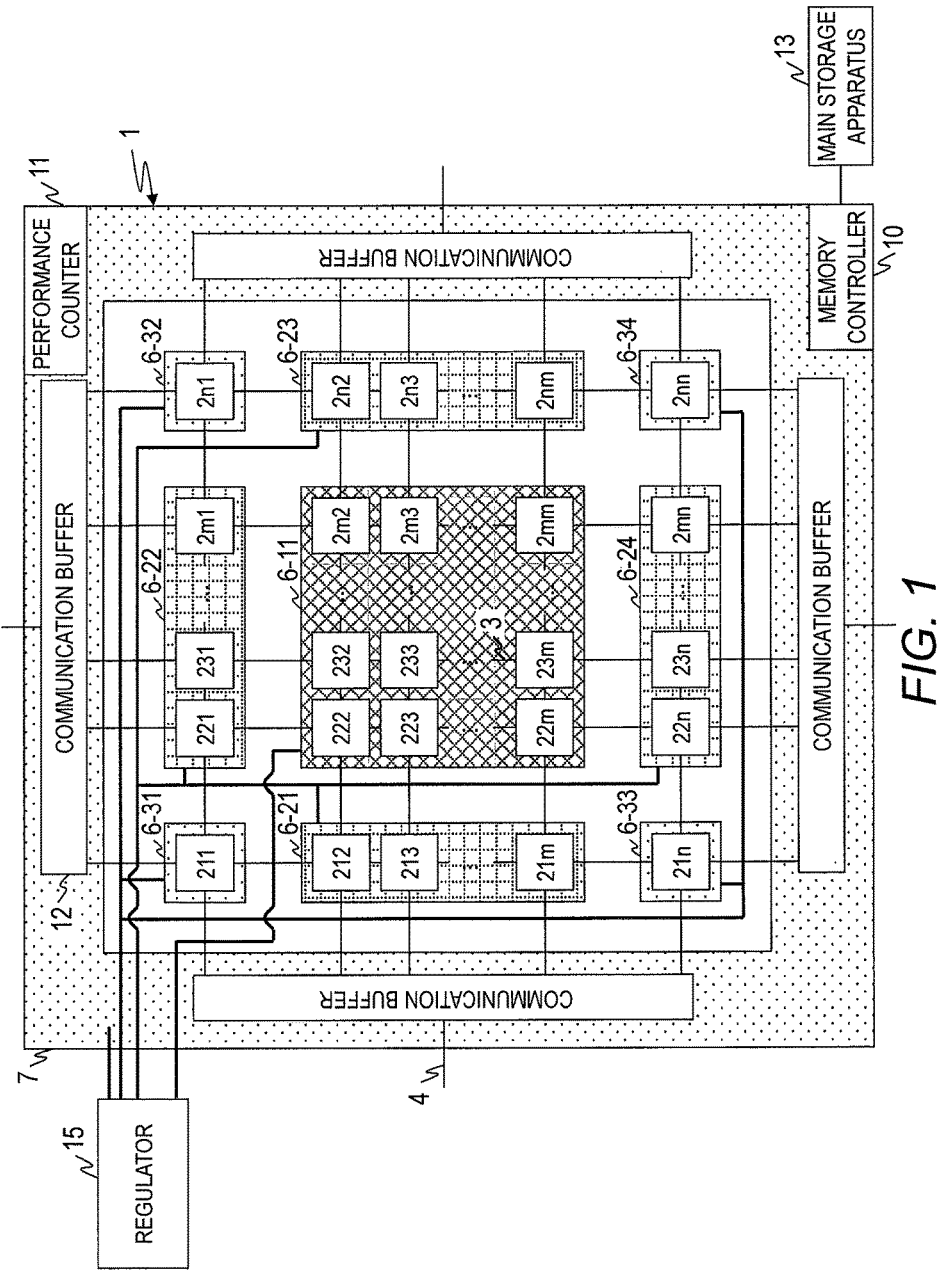
FIG. 1 is an explanatory diagram for illustrating a configuration of a many-core processor chip according to a first embodiment of this invention.

FIG. 1 is an explanatory diagram for illustrating a configuration of a many-core processor chip 1 according to a first embodiment of this invention.

The many-core processor chip 1 includes a plurality of processor cores 2 (in FIG. 1, n×n processor cores 211, 212, to 2nn), a memory controller 10, a performance counter 11, and communication buffers 12. The many-core processor chip 1 includes a memory (not shown) locally coupled to each of the processor cores 2.

The processor core 2 is a calculation apparatus configured to carry out various types of calculation processing in accordance with a program. Moreover, the processor core 2 is configured to carry out communication processing to/from another processor core 2 in order to refer to data, for example. The many-core processor chip 1 of the first embodiment includes n×n processor cores 2.

Respective processor cores 2 are coupled to one another via an intra-chip network 3 having a two-dimensional mesh structure. The intra-chip network 3 is constructed by paths each directly coupling the processor cores 2 to one another in the many-core processor chip 1.

Moreover, each of the processor cores 2 arranged on a boundary of the many-core processor chip 1 has a path directly coupled to the communication buffer 12. A path used for communication between the many-core processor chips 1 is coupled to the communication buffer 12. The many-core processor chip 1 is coupled to another many-core processor chip 1 via an inter-chip network 4 constructed by those paths.

The processor core 2 is configured to carry out inter-core communication to/from another processor core 2. The inter-core communication includes intra-chip communication, which is communication between the processor cores 2 included in the many-core processor chip 1, and inter-chip communication, which is communication between the processor cores 2 included in different many-core processor chips 1.

In the first embodiment, the processor cores 2 in the many-core processor chip 1 have the coupling relationship described above, and an arrangement of the processor cores 2 may thus be represented as a logical two-dimensional plane. In the first embodiment, the arrangement of the processor cores 2 in the logical two-dimensional plane and the arrangement of the processor cores 2 in the many-core processor chip 1 match each other. Here, the arrangement of the processor core 2 in the logical two-dimensional plane (xy plane) is denoted by a number representing an x coordinate and a number representing a y coordinate. For example, a processor core 213 represents the processor core 2 arranged at a position whose x coordinate is "1" and y coordinate is "3". The processor core 213 is the processor core 2 arranged on the boundary of the many-core processor chip 1, and is configured to communicate to/from a processor core 2 arranged on the boundary of another many-core processor chip 1 via the communication buffer 12 and the inter-chip network 4. In other words, the processor core 213 is configured to carry out the inter-chip communication.

The memory controller 10 is configured to control access to a main storage apparatus 13. The performance counter 11 is configured to measure a calculation amount of the processor cores 2 and an amount of data transmitted/received via the inter-chip network 4 during the execution of the program. The communication buffer 12 is configured to temporarily store the data transmitted/received in the communication between the many-core processor chips 1.

The many-core processor chip 1 of the first embodiment has such a configuration as to be divided into a plurality of regions each constructed by at least one processor core 2. More specifically, the many-core processor chip 1 is physically divided into a plurality of regions defined by an attribute of the inter-core communication. In this case, the attribute of the inter-core communication refers to the number of paths for coupling the many-core processor chips 1 to one another, namely, the number of paths for carrying out the inter-chip communication.

The many-core processor chip 1 illustrated in FIG. 1 is divided into regions 6 of three types, that is, a region 6-11, regions 6-21, 6-22, 6-23 and 6-24, and regions 6-31, 6-32, 6-33, and 6-34. The communication buffers 12, the memory controller 10, and the performance counter 11 on the many-core processor chip 1 are separated as a region (input/output region 7) independently of the processor cores 2.

The region 6-11 is a region constructed by the processor cores 2 not having paths directly coupling to the communication buffers 12. The processor cores 2 included in the region 6-11 do not carry out the inter-chip communication.

The regions 6-21, 6-22, 6-23, and 6-24 are regions each constructed by the processor cores 2 each including a path directly coupled to the communication buffer 12 that is coupled to the inter-chip network 4 in any one of the x direction and the y direction. The processor cores 2 included in the regions 6-21, 6-22, 6-23, and 6-24 are configured to carry out the inter-chip communication in the one direction.

The regions 6-31, 6-32, 6-33, and 6-34 are regions each constructed by the processor core 2 including a path directly coupled to the communication buffer 12 that is coupled to the inter-chip network 4 in the x direction and a path directly coupled to the communication buffer 12 that is coupled to the inter-chip network 4 in the y direction. The processor cores 2 included in the regions 6-31, 6-32, 6-33, and 6-34 are configured to carry out the inter-chip communication in the two directions.

In the first embodiment, the regulator 15 is coupled to the respective regions 6 and the input/output region 7, and is configured to supply a power supply voltage and a frequency to each of the regions 6 in accordance with a predetermined power mode, and supply a power supply voltage to the input/output region 7. In this case, the power mode refers to a combination of values of the power supply voltage and the frequency. The regulator 15 holds information for managing a plurality of power modes, and is configured to set the power mode of each of the regions 6 based on an instruction of a determination module 104 described later, thereby supplying the power supply voltage and the frequency to the processor core 2 included in each of the regions 6. As described later, the different power modes are set in accordance with the type of the regions 6.

In a case of the computer system in which a plurality of many-core processor chips 1 are mutually coupled to one another, the input/output of data between the many-core processor chips 1 needs to be carried out at a high speed, and the regulator 15 is thus configured to supply a constant power supply voltage to the input/output region 7.

Figure 2:
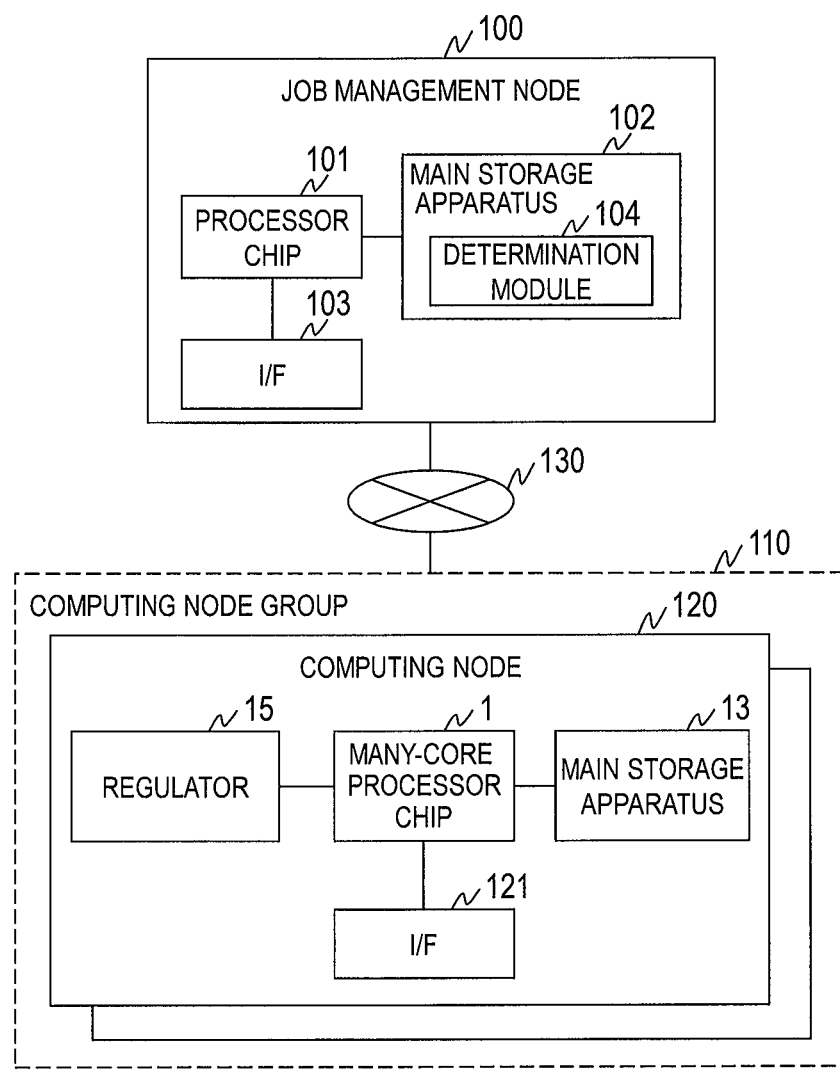
FIG. 2 is an explanatory diagram for illustrating a configuration example of a computer system including the many-core processor chips of the first embodiment.
Figure 3:
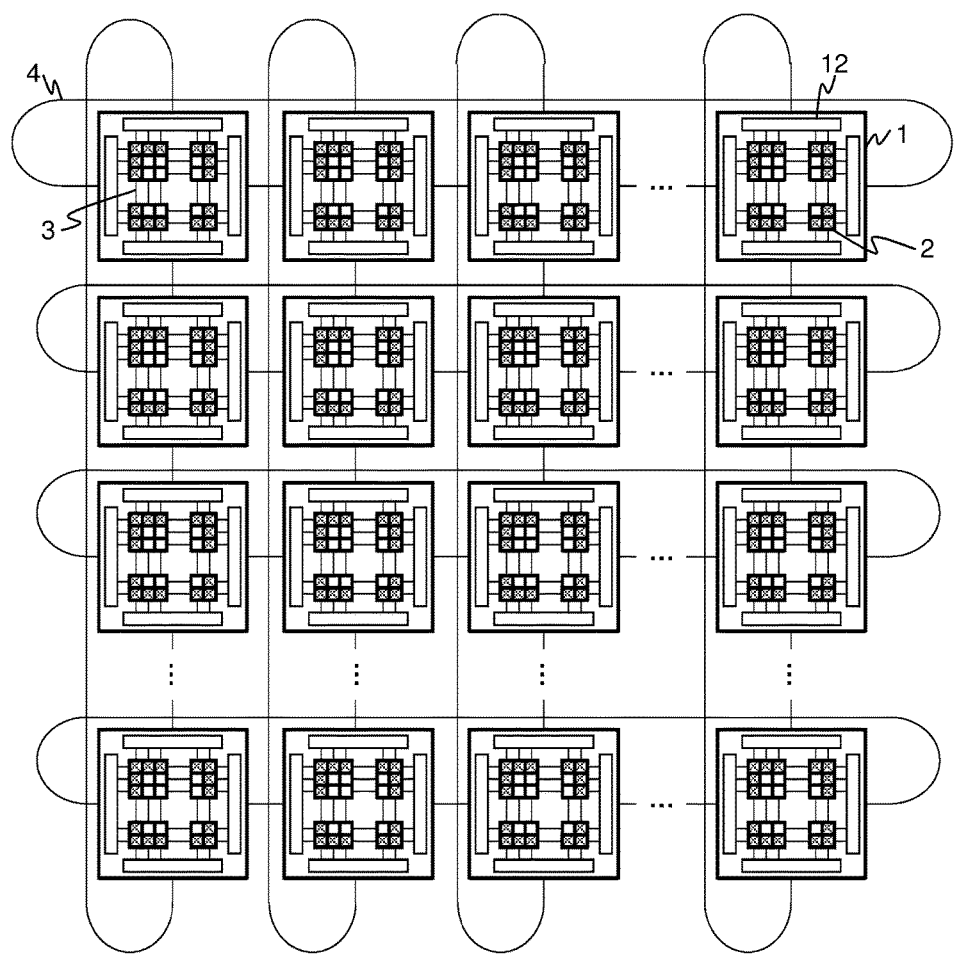
FIG. 3 is an explanatory diagram for illustrating a configuration example of an interconnection of the computer system according to the first embodiment.

FIG. 2 is an explanatory diagram for illustrating a configuration example of the computer system including the many-core processor chips 1 of the first embodiment. FIG. 3 is an explanatory diagram for illustrating a configuration example of an interconnection of the computer system according to the first embodiment.

The computer system is constructed by a job management node 100 and a computing node group 110, and the job management node 100 and the computing node group 110 are coupled to each other via a network 130. As the network 130, a local area network (LAN), a wide area network (WAN), and the like are conceivable, but the first embodiment is not limited by the type of the network 130.

The job management node 100 is configured to assign a job to a computing node 120 included in the computing node group 110. The job management node 100 includes a processor chip 101, a main storage apparatus 102, and an interface 103.

The processor chip 101 is a general-purpose processor chip, and includes at least one processor core. The main storage apparatus 102 is configured to store programs to be executed by the processor cores and information necessary for the programs. The main storage apparatus 102 of the first embodiment stores a program for implementing the determination module 104. The determination module 104 is configured to determine the power mode of each region 6, and instruct the regulator 15 to set the power mode. The interface 103 is an interface for coupling to the computing node group 110 via the network 130.

The computing node group 110 includes a plurality of computing nodes 120. The computing node 120 includes the many-core processor chip 1, the main storage apparatus 13, the regulator 15, and an interface 121. The computing node 120 may include two or more many-core processor chips 1.

The plurality of computing nodes 120, namely, the plurality of many-core processor chips 1, are, for example, coupled to one another via the inter-chip network 4 configured as illustrated in FIG. 3. As illustrated in FIG. 1, the respective processor cores 2 in the many-core processor chip 1 are coupled to one another via the intra-chip network 3 in the mesh structure. The respective many-core processor chips 1 are coupled to one another via the inter-chip network 4 having a torus structure that has the same dimensions as those of the intra-chip network 3.

In theory, a system in which all the processor cores 2 are coupled to one another in a torus structure is implemented by constructing the inter-chip network 4 having the torus structure that has the same dimensions as those of the intra-chip network 3 having the mesh structure. However, due to a restriction imposed by an input/output throughput between the many-core processor chips 1, communication performance of the communication between the processor cores 2 included in different many-core processor chips 1, namely, the inter-chip communication, is much less than communication performance of the intra-chip communication.

Now, as an example of a large-scale scientific and technical computing, it is considered that a parallel program capable of handling a problem on a grid is executed by the computing node group 110. In this case, the job management node 100 delivers a parallel job to each computing node 120. The parallel job corresponds to a program that is parallelized so as to equally assign a grid point acquired by region division to each processor core 2 so that calculation processing carried out by each processor core 2 is the same and that the computing amount is even.

In such a parallel program, when the processor core 2 refers to data of a grid point neighboring a grid point assigned to this processor core 2 to update data of the assigned grid point, the processor cores 2 often communicate to/from one another. Therefore, when the grid point is assigned to each processor core 2 to cause the processor core 2 to execute the parallel job in the computer system constructed by the inter-chip network 4 as illustrated in FIG. 3, the frequency of the communication between the neighboring processor cores 2 is the highest.

As described above, there is a great difference between the communication performance of the inter-chip communication and the communication performance of the intra-chip communication. Therefore, when a certain processor core 2 refers to data of a grid point assigned to a neighboring processor core 2, an access time via the inter-chip communication is longer than an access time via the intra-chip communication. Thus, in the processor core 2 arranged on the boundary of the many-core processor chip 1, namely, the processor core 2 directly communicating to/from the processor core 2 of another many-core processor chip 1, a delay corresponding to a wait period caused by the inter-chip communication is generated in the processing.

In calculation processing of repeatedly updating the data at the grid point, the calculation processing does not proceed to the next update until the data is updated at all the grid points, and a processing speed of the entire parallel processing is thus limited by the processor cores 2 having the slowest processing speed.

In order to solve the above-mentioned problem, the many-core processor chip 1 divided into the plurality of regions 6 as illustrated in FIG. 1 is used to minimize the wait period of the processor cores 2, thereby increasing power efficiency of the many-core processor chip 1. Specifically, the regulator 15 sets the power mode of each region 6 based on the instruction from the determination module 104, and supplies the power supply voltage and the frequency to each region 6 in accordance with the set power mode.

Figure 4:
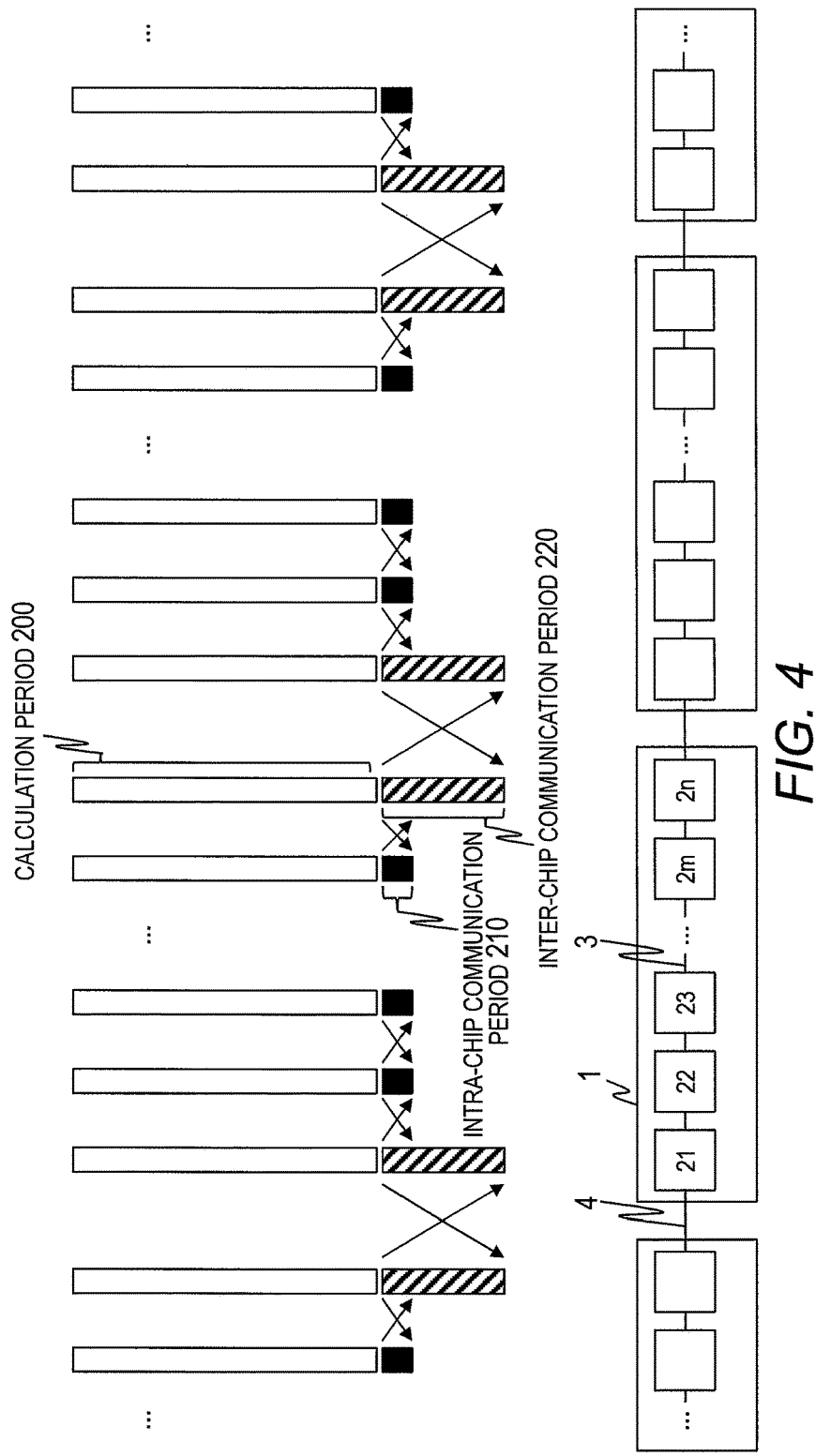
FIG. 4, FIG. 5, and FIG. 6 are explanatory diagrams for illustrating the method of controlling a power mode for each region in the many-core processor chip according to the first embodiment.
Figure 5:
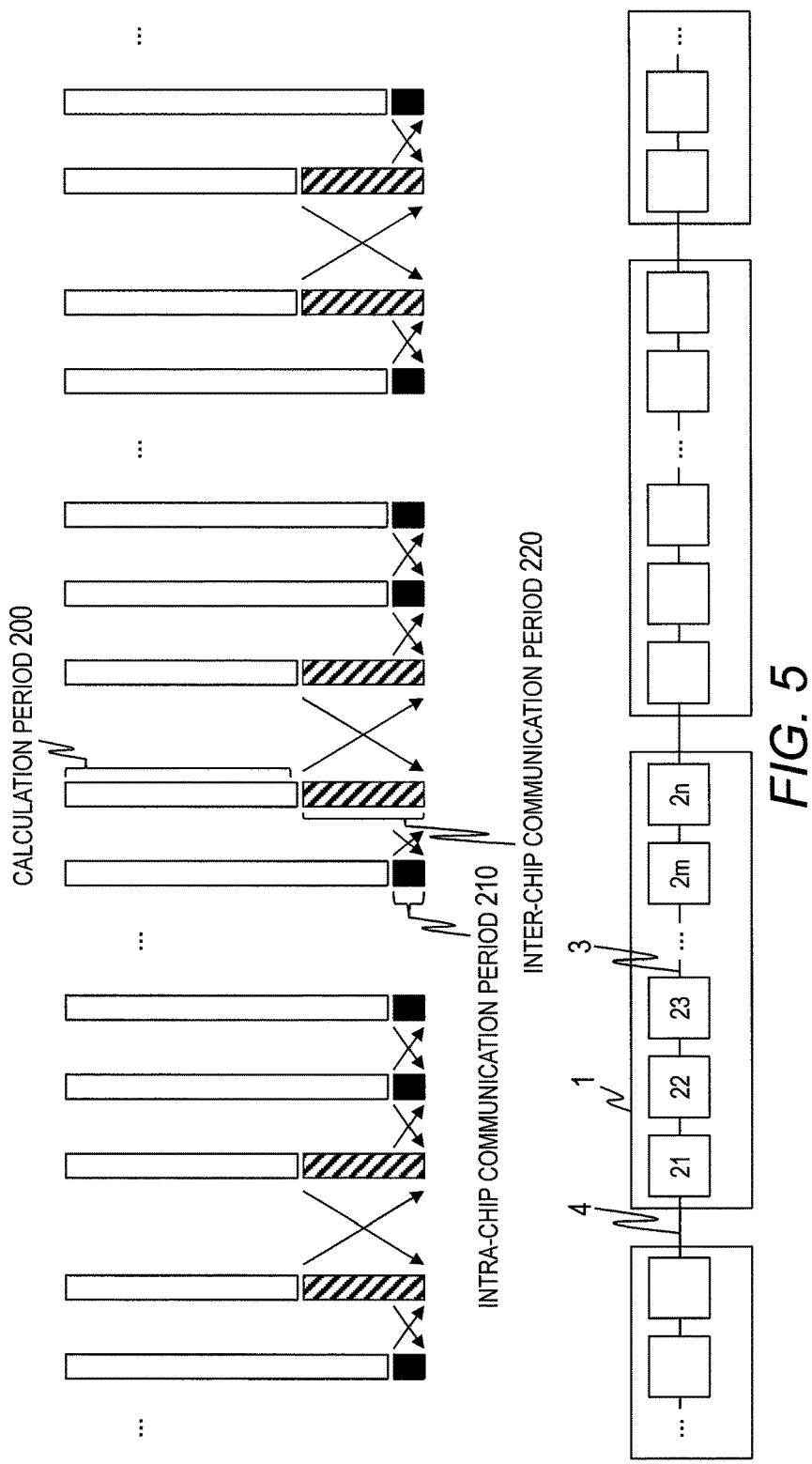
Figure 6:
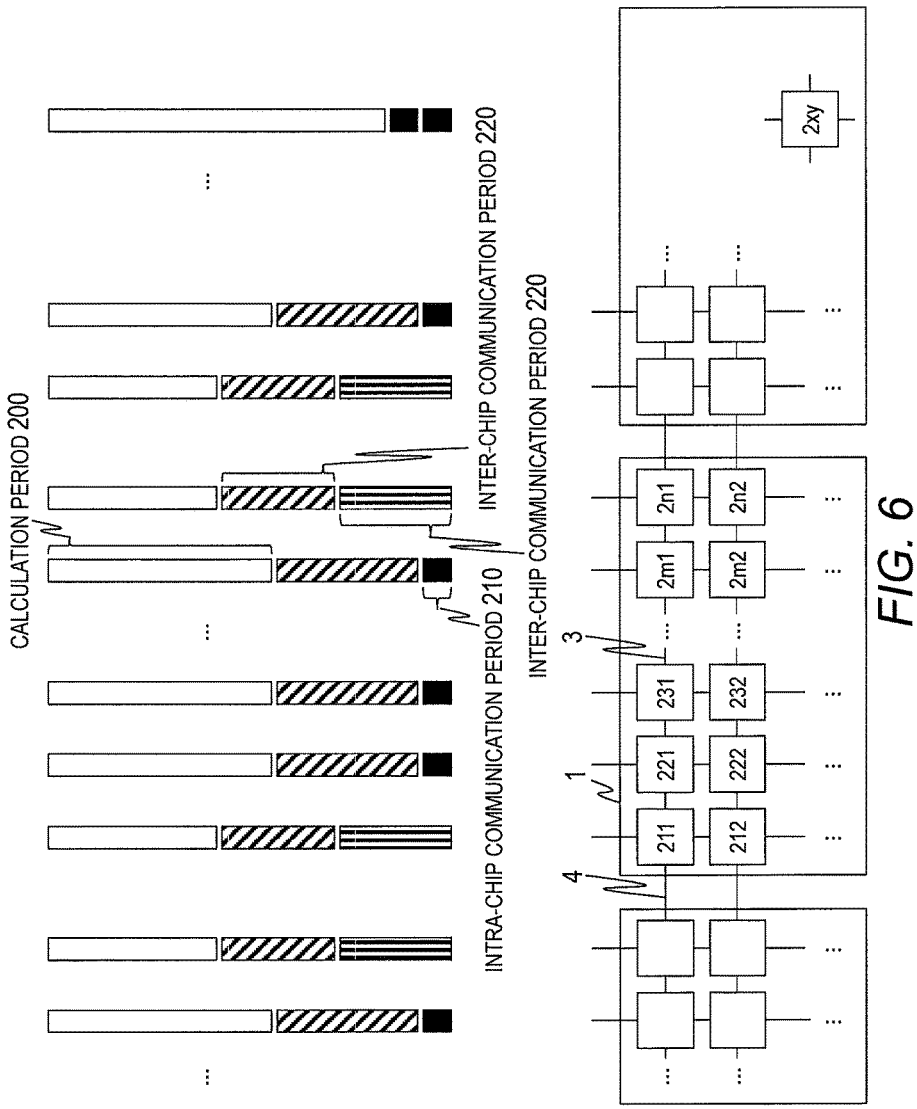

Referring to FIG. 4, FIG. 5, and FIG. 6, a description is now given of a method of controlling the power mode when the parallel program corresponding to the problem on the grid is executed.

FIG. 4, FIG. 5, and FIG. 6 are explanatory diagrams for illustrating the method of controlling the power mode for each region in the many-core processor chip 1 according to the first embodiment. FIG. 4 and FIG. 5 are diagrams where a one-dimensional coupling of the many-core processor chip 1 is focused on.

In FIG. 4, there are illustrated calculation periods and inter-core communication periods of the processor cores 2 in a case where the regulator 15 sets the same power mode to all the regions 6. Each processor core 2 carries out the same calculation processing, and carries out the inter-core communication to/from other processor cores 2 in order to refer to data updated by the calculation processing. In FIG. 4, calculation periods 200, which are execution periods of the calculation processing, and inter-processor core communication periods 210 and 220 are illustrated. The inter-processor core communication period 210 refers to an execution period of the intra-chip communication, and the inter-processor core communication period 220 refers to an execution period of the inter-chip communication.

When the same power supply voltage and the same frequency are supplied to each processor core 2, the calculation amount assigned to each processor core 2 is the same, and the calculation period 200 of each processor core 2 is thus the same.

A data amount of data transmitted/received among the processor cores 2 is the same, but the intra-chip communication and the inter-chip communication are greatly different from each other in communication performance. Thus, the communication period (inter-chip communication period 220) of the inter-core communication of the processor cores 21 and 2n arranged on the boundary of the many-core processor chip 1 is longer than the communication period (intra-chip communication period 210) of the inter-core communication of the processor cores 22, 23, and 2m arranged inside the many-core processor chip 1.

Thus, the processor cores 22, 23, and 2m arranged inside the many-core processor chip 1 are in the wait state until the inter-chip communication of the processor cores 21 and 2n is finished. In other words, the wait period is generated.

In FIG. 5, there are illustrated the calculation periods and the inter-core communication periods of the processor cores 2 in a case where the regulator 15 sets the power mode so as to increase the power supply voltage and the frequency of the processor cores 21 and 2n, and sets the power mode so as to decrease the power supply voltage and the frequency of the processor cores 22, 23, and 2m.

The power supply voltage and the frequency supplied to the processor cores 21 and 2n are set to be high, and the calculation period 200 thus decreases. On the other hand, the power supply voltage and the frequency supplied to the processor core 22, 23, and 2m are set to be low, and the calculation period 200 thus increases. As a result, the calculation performance is adjusted so that the calculation processing of the processor cores 22, 23, and 2m is carried out while the inter-chip communication of the processor cores 21 and 2n is carried out. In this way, the regulator 15 can be configured to control the power mode of each region 6, thereby decreasing the wait period illustrated in FIG. 4.

In this case, the determination module 104 determines the power mode of each region 6 based on the following three conditions.

(Condition 1) The power mode falls within a range of thermal design power.

(Condition 2) The power mode minimizes the maximum value of the sums of the calculation period and the inter-core communication period of the processor cores 2 included in the respective regions.

(Condition 3) The power mode decreases differences among the sums of the calculation period and the inter-core communication period of the processor cores 2 included in the respective regions.

Condition 1 is a condition for inhibiting a power consumption of the entire many-core processor chip 1 from exceeding an upper limit. Condition 2 is a condition for increasing the power supply voltage and the frequency in order to increase the speed of the calculation processing of the processor cores 2 arranged on the chip boundary that require many cycles for the inter-chip communication. Moreover, Condition 3 is a condition for decreasing the power supply voltage and the frequency in order to increase the calculation period of the processor cores 2 that carry out only the intra-chip communication and can thus carry out the communication in a less number of cycles.

The determination module 104 determines the power mode of the each region 6 based on the above-mentioned three conditions, thereby being able to increase the power efficiency of the many-core processor chips 1 and the computer system.

In FIG. 6, there are processor cores 211 and 2n1 having paths coupling to many-core processor chips 1 in two directions, and processor cores 211, 221, 231, 2m1, and 2n1 having paths coupling to the many-core processor chip 1 in one direction. In the inter-chip communication in the two directions, a data amount that is twice as much as that in the inter-chip communication in the one direction is transmitted/received, and the communication period of the inter-chip communication in the two directions is thus longer than the communication period of the inter-chip communication in the one direction.

Therefore, the determination module 104 determines the power mode so as to increase the power supply voltage and the frequency supplied to the region 6 in descending order of the number of paths for the inter-chip communication of the processor core 2 included in the region 6. In other words, the determination module 104 determines the power modes so as to decrease the power supply voltage and the frequency in the order of the regions 6-31, 6-32, 6-33, and 6-34, the regions 6-21, 6-22, 6-23, and 6-24, and the region 6-11. As a result, the wait period of the communication processing can be minimized, and the power efficiency can be increased in the processor cores 2.

Specifically, for the regions 6 including the processor cores 211 and 2n1, the determination module 104 determines such a combination (power mode) of the power supply voltage and the frequency as to decrease the calculation period 200. Moreover, for the regions 6 including the processor cores 212, 221, 231, 2m1, 2n1, and 2n2, the determination module 104 determines the power mode so that the calculation processing is carried out during the inter-chip communication other than the inter-chip communication carried out by those processor cores 2. Moreover, for the region 6 including the processor cores 222, 232, 2m2, and 2xy, the determination module 104 determines the power mode so that the calculation processing is carried out during the inter-chip communication of the processor cores 2 in other regions 6.

As a result, the differences among the sums of the processing periods of the respective processor cores 2 are minimized. Thus, the power efficiency of the many-core processor chip 1 can be increased.

Next, a description is given of specific processing of implementing the above-mentioned control.

Figures 7, 8, 9:
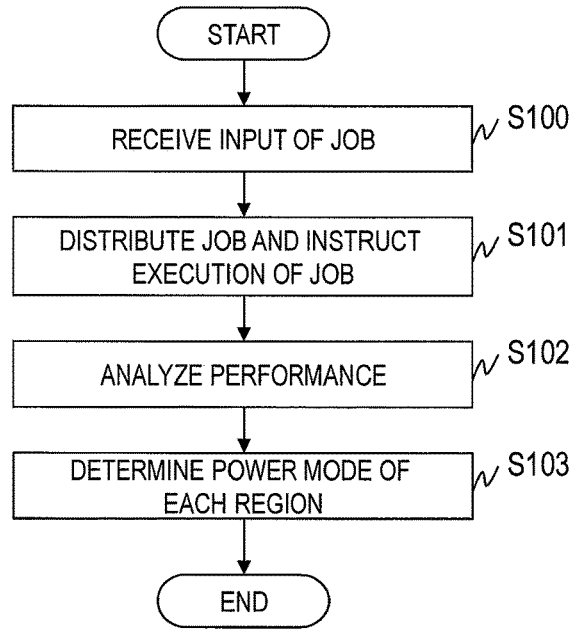
FIG. 7 is an explanatory table for showing an example of power mode management information held by a regulator according to the first embodiment.
FIG. 8 is a flowchart for illustrating processing carried out by a job management node according to the first embodiment.
FIG. 9 is an explanatory diagram for illustrating an example of a job description for instructing input of a job according to the first embodiment.

FIG. 7 is an explanatory table for showing an example of power mode management information 300 held by the regulator 15 according to the first embodiment. In the first embodiment, the determination module 104 also holds the same power mode management information 300.

The power mode management information 300 is information for managing the power mode that is set for each region by the regulator 15. The power mode management information 300 includes mode IDs 301, voltages 302, and frequencies 303.

The mode ID 301 is an identifier for uniquely identifying a power mode. The voltage 302 and the frequency 303 are a combination of a specific power supply voltage and frequency of the power mode corresponding to the mode ID 301.

FIG. 8 is a flowchart for illustrating processing carried out by the job management node 100 according to the first embodiment. FIG. 9 is an explanatory diagram for illustrating an example of a job description 400 for instructing input of a job according to the first embodiment.

In the first embodiment, the determination module 104 of the job management node 100 analyzes, in advance, processing performance of the computing node 120 for a parallel program, to thereby determine the power mode to be set to each region 6. In the first embodiment, the function of the determination module 104 is implemented by using a job scheduler.

The job management node 100 receives the input of the job (Step S100). The job management node 100 distributes the parallel job to each processor core 2 of the many-core processor chip 1, and instructs the execution of the parallel job in accordance with a predetermined schedule (Step S101). At this time, the performance counter 11 of the many-core processor chip 1 measures the power consumption of the many-core processor chip 1, and the calculation amount and the communication data amount of each processor core 2 during the execution of the parallel job.

The job management node 100 analyzes the processing performance based on the execution result of the parallel program (Step S102), and determines the power mode to be set to each region 6 based on a result of the analysis.

Specifically, the job management node 100 identifies a main portion of the parallel program for which the power mode needs to be controlled. For example, a portion corresponding to processing that requires a long calculation period corresponds to the main portion. The job management node 100 determines the power mode to be set to each region 6 based on the power consumption of the many-core processor chip 1, and the calculation amount and the communication data amount of each processor core 2 measured by the performance counter 11. When a plurality of processor cores 2 are included in one region 6, the calculation amount and the communication data amount of at least one processor core 2 are measured.

The power mode to be set to each region 6 is determined based on, for example, the calculation amount and the communication data amount of the inter-chip communication of the processor core 2 executing the parallel job. Here, a variable representing the calculation amount is denoted by "A", and a variable representing the communication amount of the inter-chip communication is denoted by "C". Moreover, a variable representing a throughput of the inter-chip communication is denoted by "b", and a variable representing the frequency of the processor core 2 arranged on the boundary of the many-core processor chip 1 is denoted by "f1".

Then, the calculation period can be calculated through use of an equation represented by Expression (1), and the inter-chip communication period can be calculated through use of an equation represented by Expression (2). Moreover, when a throughput of the intra-chip communication is sufficiently larger than b, an optimal frequency f2 in the region 6-11 including only the processor cores 2 carrying out only the intra-chip communication is given by Expression (3).

[Expression (1)]
$$\text{(Calculation period)} = \frac{A}{f1} \quad (1)$$

[Expression (2)]
$$\text{(Inter-chip communication period)} = \frac{C}{b} \quad (2)$$

[Expression (3)]
$$f2 = \frac{A}{A/f1 + C/b} \quad (3)$$

In general, an upper limit value of the frequency for a stable operation at a given power supply voltage has a relationship represented by Expression (4), and the power supply voltage can thus be obtained by Expression (4).

$$V \propto f^{\alpha} \quad \text{[Expression (4)]}$$

In a case where each power mode that can be set by the regulator 15 is a combination of discrete values of the power supply voltage and the frequency, the determination module 104 determines the power mode in which approximated values of the values calculated based on the above-mentioned equations are combined and the power consumption of the entire chip does not exceed the upper limit.

Moreover, the determination module 104 stores, in the main storage apparatus 102, control information associating the parallel program, the main portion of the parallel program, and the power mode of each region 6 with one another. The control information may be output to another apparatus.

In a case where an operator requests execution of the parallel program, the operator specifies, based on the control information, the power mode or the calculation amount and the communication data amount of each region 6 in the main portion in the script for inputting the job, namely, the job description 400, which is an execution request for the parallel program. The job description 400 illustrated in FIG. 9 includes lines for specifying the calculation amount and the communication data amount.

In a case where the job management node 100 receives the input of the job via this job description 400, the determination module 104 outputs to the regulator 15 identification information on each region 6 and an identifier of the power mode to be set to each region 6. The regulator 15 controls the power mode of each region 6 in accordance with the instruction from the determination module 104.

The determination module 104 of the job management node 100 selects the power mode of the each region 6, but the many-core processor chip 1 may have the same function. For example, a program for implementing the determination module 104 may be stored in the main storage apparatus 13, and at least one processor core 2 of the many-core processor chip 1 may execute this program, thereby implementing the determination module 104 on the many-core processor chip 1.

In a case where a plurality of main portions exist, a compiler interprets the parallel program into which comment sentences each for specifying the main portion, the calculation amount, and the communication data amount are inserted, and inserts, into the parallel program, a command for the regulator 15 to set the power mode of each region 6. In this case, the processor core 2 corresponding to the determination module 104 determines the power mode of each region 6 based on this command, and instructs the regulator 15 to set the power mode to each region 6. As a result, the power control suitable for each main portion can be provided.

According to the first embodiment, the processor cores 2 on the many-core processor chip 1 are divided into the plurality of regions 6 based on the number of paths coupling the many-core processor chips 1 to one another, and the power mode different from other regions can thus be set to each region 6. As a result, the wait period of each processor core 2 can be decreased, and the power efficiency of the many-core processor chip 1 can be increased.

Second Embodiment

In a second embodiment of this invention, the power mode of each region 6 is set during the execution of the parallel program. A description is now given of the second embodiment while focusing on differences from the first embodiment.

The configurations of the many-core processor chip 1 and the computer system according to the second embodiment are the same as those of the first embodiment, and a description thereof is therefore omitted. In the second embodiment, the method of setting the power mode to the region 6 is different.

Figure 10:
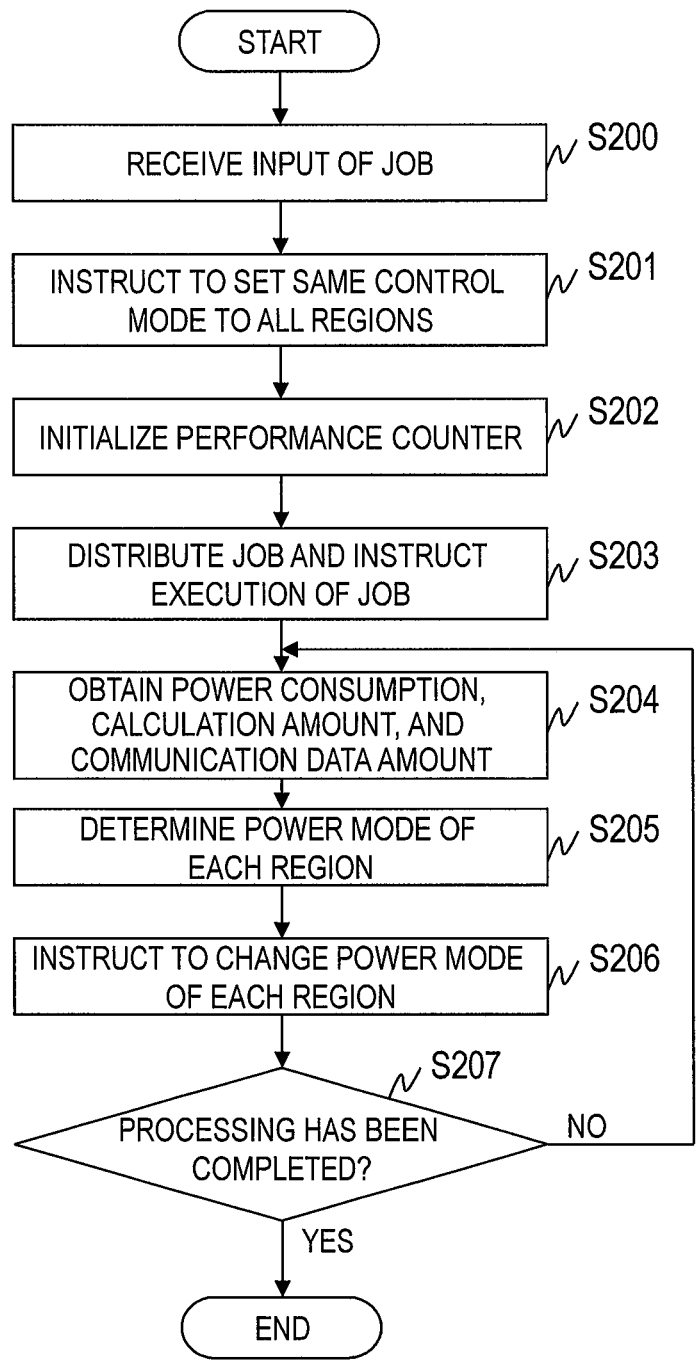
FIG. 10 is a flowchart for illustrating processing carried out by the job management node according to a second embodiment.

FIG. 10 is a flowchart for illustrating processing carried out by the job management node 100 according to the second embodiment.

The job management node 100 receives the input of the job (Step S200). The job management node 100 instructs the regulator 15 to set the same power mode to all the regions 6 (Step S201). Moreover, the job management node 100 initializes the performance counter 11 of the many-core processor chip 1 (Step S202). Then, the job management node 100 distributes a job to each processor core 2 of the many-core processor chip 1, and instructs the execution of the job in accordance with a predetermined schedule (Step S203).

The job management node 100 periodically obtains the power consumption of the many-core processor chip 1, the calculation amount of each processor core 2, and the communication data amount of each processor core 2 from the performance counter 11 (Step S204). The job management node 100 determines the power mode of each region 6 based on the values obtained from the performance counter 11 (Step S205). The method of determining the power mode is the same as that of the first embodiment, and a description thereof is therefore omitted. The job management node 100 outputs to the regulator 15 a setting instruction for the power mode including the identifier of the region 6 and the identifier of the selected power mode, thereby instructing the change in the power mode of each region 6 (Step S206).

The job management node 100 determines whether or not the processing by the parallel program is completed (Step S207). In a case where the processing by the parallel program is determined not to be completed, the job management node 100 returns to Step S204, and repeats the execution of the same processing. In a case where the processing by the parallel program is determined to be completed, the job management node 100 finishes the processing.

The determination module 104 of the job management node 100 selects the power mode of the each region 6, but the many-core processor chip 1 may have the same function. For example, a program for implementing the determination module 104 may be stored in the main storage apparatus 13, and at least one processor core 2 of the many-core processor chip 1 may execute this program, thereby implementing the determination module 104 on the many-core processor chip 1.

According to the second embodiment, the power mode can dynamically be set during the execution of the parallel program, and more detailed power control can thus be realized. Therefore, the power efficiency can further be increased.

Third Embodiment

In a third embodiment of this invention, the many-core processor chip 1 includes an external power supply and a clock generator for each region 6. A description is now given of the third embodiment while focusing on differences from the first embodiment.

Figure 11:
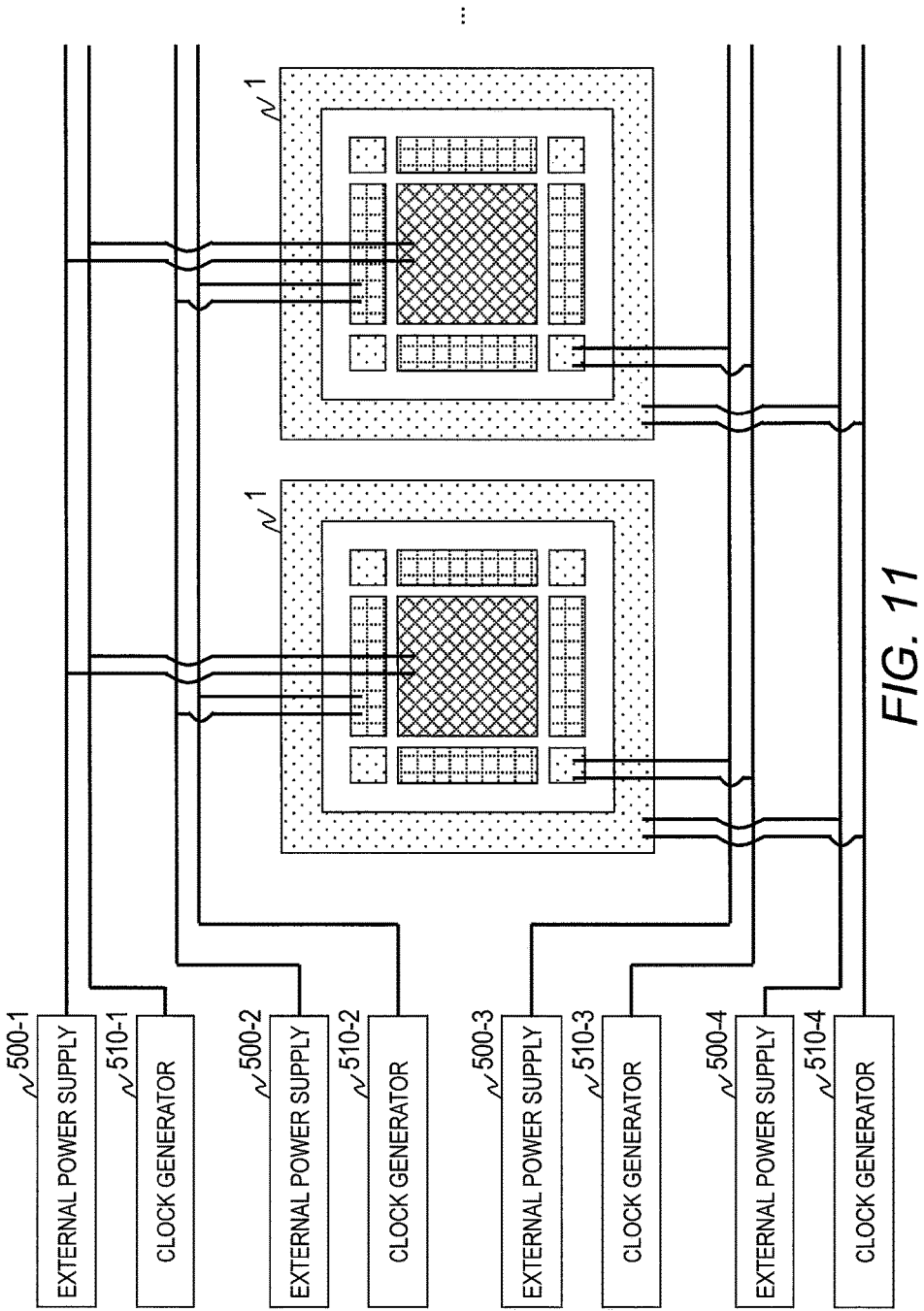
FIG. 11 is an explanatory diagram for illustrating a configuration of a many-core processor chip according to a third embodiment.

FIG. 11 is an explanatory diagram for illustrating a configuration of a many-core processor chip 1 according to the third embodiment. The configurations of the many-core processor chip 1 and the computer system are the same as those of the first embodiment, and a description thereof is therefore omitted.

The regulator 15 of the first embodiment manages the power mode as the combination of the discrete power supply voltage and frequency. However, an optimal power supply voltage and frequency take continuous values. Thus, in the first embodiment, the determination module 104 can select only the power mode that can be set by the regulator 15. Therefore, it is difficult to maximize the power efficiency of the many-core processor chip 1.

The processor cores 2 carrying out the same parallel job often carry out the same operation in the many-core processor chip 1. Therefore, the power supply voltage and the frequency of each region 6 are set as a combination of continuous values for each group of the computer system or the many-core processor chips 1, thereby increasing the power efficiency.

Thus, an external power supply 500 and a clock generator 510 are coupled to each region 6 of the many-core processor chip 1 of the third embodiment. Specifically, an external power supply 500-1 and a clock generator 510-1 are coupled to the region 6-11, an external power supply 500-2 and a clock generator 510-2 are coupled to the regions 6-21, 6-22, 6-23, and 6-24, an external power supply 500-3 and a clock generator 510-3 are coupled to the regions 6-31, 6-32, 6-33, and 6-34, and an external power supply 500-4 and a clock generator 510-4 are coupled to the input/output region 7. Moreover, the regions 6 of the many-core processor chip 1 also have the same coupling relationship.

In the third embodiment, the job management node 100 has a function corresponding to the regulator 15. In this case, the job management node 100 is coupled to each external power supply 500 and each clock generator 510 via this function. The function corresponding to the regulator 15 may be implemented by any one of hardware and software.

In the third embodiment, the determination module 104 determines the combination of continuous values of the power supply voltage and the frequency of each region 6, and the regulator 15 controls the external power supply 500 and the clock generator 510 so as to supply the determined power supply voltage and frequency. According to the third embodiment, the power supply voltage and the frequency can be adjusted more precisely than by the regulator 15 provided for the many-core processor chip 1.

According to the third embodiment, the power supply voltage and the frequency of each region 6 can be more precisely adjusted, and thus the power efficiency of the many-core processor chip 1 can further be increased.

Fourth Embodiment

In a fourth embodiment of this invention, the structure of the many-core processor chip 1 is different from that of the first embodiment. A description is now given of the fourth embodiment while focusing on differences from the first embodiment. The configuration of the computer system is the same as that of the first embodiment, and a description thereof is therefore omitted.

Figure 12:
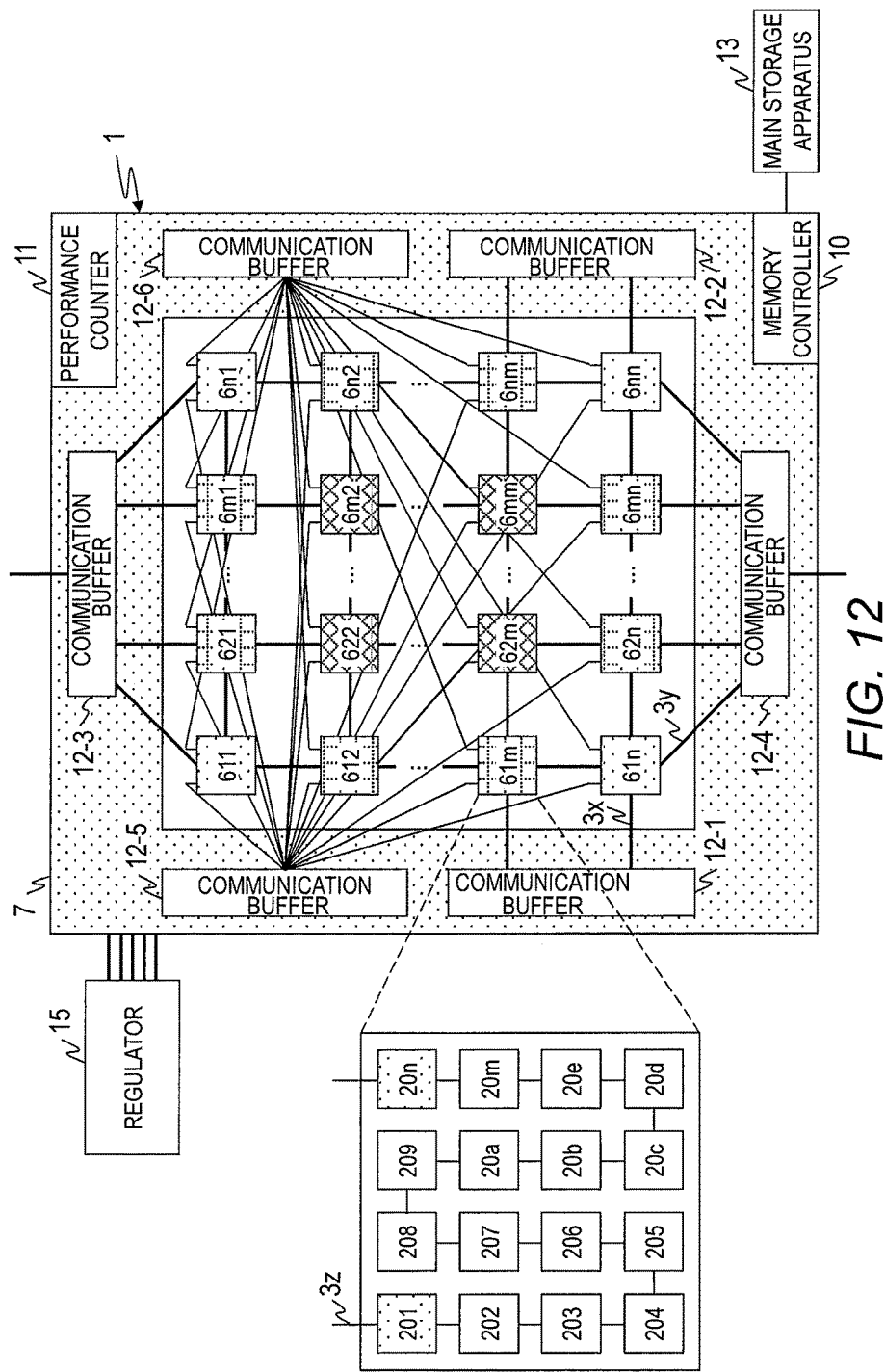
FIG. 12 is an explanatory diagram for illustrating a configuration of a many-core processor chip according to a fourth embodiment.
Figure 13:
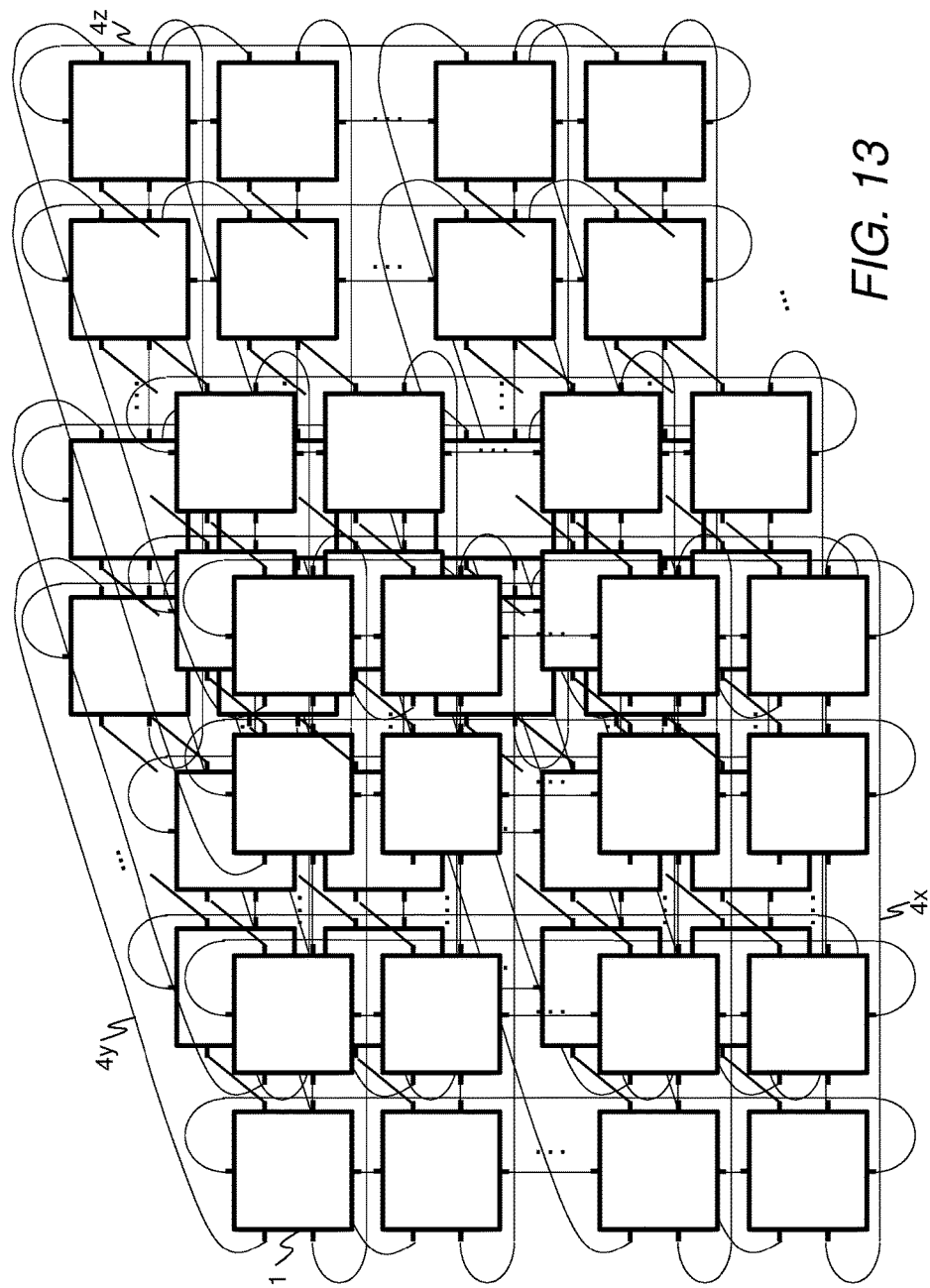
FIG. 13 is an explanatory diagram for illustrating a configuration example of the interconnection of the computer system according to the fourth embodiment.

FIG. 12 is an explanatory diagram for illustrating a configuration of a many-core processor chip 1 according to the fourth embodiment. FIG. 13 is an explanatory diagram for illustrating a configuration example of the interconnection of the computer system according to the fourth embodiment.

The many-core processor chip 1 of the fourth embodiment includes n×n×n processor cores 2. Respective processor cores 2 are coupled to one another via intra-chip networks 3x, 3y, and 3z having a three-dimensional mesh structure.

In the fourth embodiment, the arrangement of the processor core 2 in the intra-chip networks 3x, 3y, and 3z in the many-core processor chip 1 is denoted by a three-dimensional coordinate (x,y,z). n processor cores 2 having the same x coordinate and y coordinate are arranged at positions physically neighboring one another. For example, in FIG. 12, 16 processor cores 2 are arranged in a region 61m on a plane where x=1 and y=m.

The intra-chip network 3z in the z direction sequentially couples, for example, the processor cores 2 from a processor core 201 to a processor core 20n in the region 61m. The processor cores 201 and 20n are coupled to communication buffers 12-5 and 12-6 in the z direction via the intra-chip network 3z, thereby communicating to/from the outside of the many-core processor chip 1.

The intra-chip network 3x in the x direction couples, for example, between the region 61m and a region 62m, processor cores 2 having the same relative position in the respective regions to each other. The regions 611, 612, 61m, and 61n are coupled to a communication buffer 12-1 in the x direction via the intra-chip network 3x, thereby communicating to/from the outside of the many-core processor chip 1. Moreover, the regions 6n1, 6n2, 6nm, and 6nn are coupled to a communication buffer 12-2 in the x direction via the intra-chip network 3x, thereby communicating to/from the outside of the many-core processor chip 1.

The intra-chip network 3y in the y direction couples, for example, between the region 61m and a region 61n, processor cores 2 having the same relative position in the respective regions to each other. The regions 611, 621, 6m1, and 6n1 are coupled to a communication buffer 12-3 in the y direction via the intra-chip network 3y, thereby communicating to/from the outside of the many-core processor chip 1. Moreover, the regions 61n, 62n, 6mn, and 6nn are coupled to a communication buffer 12-4 in the y direction via the intra-chip network 3y, thereby communicating to/from the outside of the many-core processor chip 1.

When the paths coupled to the communication buffers 12 are focused on, the processor cores 2 included in the regions 611, 612, 61m, and 61n, and the regions 6n1, 6n2, 6nm, and 6nn have paths for the inter-chip communication in the x direction. The processor cores 2 included in the regions 611, 621, 6m1, and 6n1, and the regions 61n, 62n, 6mn, and 6nn have paths for the inter-chip communication in the y direction. Moreover, each region 6 has a path for the inter-chip communication in the z direction, for example, those of the processor cores 201 and 20n.

From the above-mentioned characteristics, the processor cores 2 in the many-core processor chip 1 of the fourth embodiment are divided into regions of four types, that is, an internal region, a boundary surface region, a boundary line region, and a corner region based on the logical position (position in the three-dimensional mesh) of each processor core 2 in the intra-chip networks 3x, 3y, and 3z of the three-dimensional mesh structure.

Now, a model of the logical many-core processor chip 1 in which the processor core 2 is arranged on each grid point of a cube including n×n×n grid points is considered. The processor cores 2 arranged on boundaries of the cube are coupled to other many-core processor chips 1 via paths.

Specifically, each of the processor cores 2 arranged on the edges of the cube is coupled to two paths. Moreover, each of the processor cores 2 arranged on the corners of the cube is coupled to three paths. Moreover, each of the processor cores 2 arranged on the surfaces of the cube other than the processor cores 2 arranged on the edges and the corners of the cube is coupled to one path. Each of processor cores 2 arranged inside the cube does not have a path coupled to the outside.

From the above-mentioned consideration, it is appreciated that each region 6 has the following structure. The internal region is a region constructed by processor cores 2 each of which does not have a path for the inter-chip communication. The boundary surface region is a region constructed by processor cores 2 each of which has one path for the inter-chip communication. The boundary line region is a region constructed by processor cores 2 each of which has two paths for the inter-chip communication. Further, the corner region is a region constructed by processor cores 2 each of which has three paths for the inter-chip communication.

Moreover, as in the first embodiment, the communication buffers 12, the memory controller 10, and the performance counter 11 on the many-core processor chip 1 are separated as the region (input/output region 7) independently of the processor cores 2.

A plurality of many-core processor chips 1 are coupled to one another via the inter-chip network 4 configured as illustrated in FIG. 13. As illustrated in FIG. 12, the respective processor cores 2 in the many-core processor chip 1 are coupled to one another via the intra-chip networks 3x, 3y, and 3z having the mesh structure. The respective many-core processor chips 1 are coupled to one another via the inter-chip networks 4x, 4y, and 4z having a torus structure that has the same dimensions as those of the intra-chip networks 3 in the many-core processor chips 1.

A system in which all the processor cores 2 are logically coupled to one another in the torus structure is implemented by constructing the inter-chip networks 4x, 4y, and 4z having the torus structure that has the same dimensions as those of the intra-chip networks 3x, 3y, and 3z having the mesh structure.

It is considered that a parallel program capable of handling the same problem on a grid as that of the first embodiment is executed by the computing node group 110. In this case, in the processor core 2 that directly communicates to/from the processor core 2 in another many-core processor chip 1, a delay corresponding to a wait period caused by the inter-chip communication is generated in the processing.

For example, the communication data amount of the eight processor cores 2 arranged at the corners in the three-dimensional mesh structure, namely, the processor cores 2 included in the corner regions, is three times of the communication data amount of the processor cores 2 included in the boundary surface region. Therefore, the communication period of the inter-chip communication is long.

Therefore, when the parallel program capable of handling the problem on the grid is executed by the computing node group 110, a processing speed of the entire parallel processing is limited by the processor cores 2 whose processing speed is the slowest.

Therefore, the determination module 104 determines the power modes so that the power supply voltage and the frequency decrease in the order of the corner region, the boundary line region, the boundary surface region, and the internal region. As a result, the calculation speed of each processor core 2 is adjusted so that the wait period caused by the inter-chip communication is minimized. As a result, the power efficiency of the many-core processor chip 1 can be increased.

Moreover, the power mode can be adjusted depending on implementation of the many-core processor chip 1. For example, when the z coordinate is determined for each rack, and the inter-chip communication in the z direction is communication between the racks, the communication performance of the inter-chip communication in the x direction and the communication performance of the inter-chip communication in the y direction are the same, but the inter-chip communication performance in the z direction is less than the communication performance of the inter-chip communication in the x direction and the y direction.

In a case where the communication performances of the inter-chip communication are different from one another as described above, the determination module 104 determines the power mode of the boundary line region or the boundary surface region including the processor cores 2 that carry out the inter-chip communication in the z direction so that the power mode is different from the power modes of other boundary line regions or boundary surface regions. As a result, the wait period caused by the difference in communication performance of the inter-chip communication can be decreased. The method of determining the power mode to be set and the like are the same as those of the first embodiment, and a description thereof is therefore omitted.

The present invention is not limited to the above embodiment and includes various modification examples. In addition, for example, the configurations of the above embodiment are described in detail so as to describe the present invention comprehensibly. The present invention is not necessarily limited to the embodiment that is provided with all of the configurations described. In addition, a part of each configuration of the embodiment may be removed, substituted, or added to other configurations.

A part or the entirety of each of the above configurations, functions, processing units, processing means, and the like may be realized by hardware, such as by designing integrated circuits therefor. In addition, the present invention can be realized by program codes of software that realizes the functions of the embodiment. In this case, a storage medium on which the program codes are recorded is provided to a computer, and a CPU that the computer is provided with reads the program codes stored on the storage medium. In this case, the program codes read from the storage medium realize the functions of the above embodiment, and the program codes and the storage medium storing the program codes constitute the present invention. Examples of such a storage medium used for supplying program codes include a flexible disk, a CD-ROM, a DVD-ROM, a hard disk, a solid state drive (SSD), an optical disc, a magneto-optical disc, a CD-R, a magnetic tape, a non-volatile memory card, and a ROM.

The program codes that realize the functions written in the present embodiment can be implemented by a wide range of programming and scripting languages such as assembler, C/C++, Perl, shell scripts, PHP, and Java (registered trademark).

It may also be possible that the program codes of the software that realizes the functions of the embodiment are stored on storing means such as a hard disk or a memory of the computer or on a storage medium such as a CD-RW or a CD-R by distributing the program codes through a network and that the CPU that the computer is provided with reads and executes the program codes stored on the storing means or on the storage medium.

In the above embodiment, only control lines and information lines that are considered as necessary for description are illustrated, and all the control lines and information lines of a product are not necessarily illustrated. All of the configurations of the embodiment may be connected to each other.

What is claimed is:

1. A computer system, comprising a plurality of computers,
   each of the plurality of computers including at least one processor chip each including a plurality of processor cores,
   the at least one processor chip constructing a plurality of regions each constructed by at least one processor core,
   each of the plurality of processor cores being configured to carry out calculation processing for executing a predetermined program and inter-core communication processing, which is communication between the plurality of processor cores,
   the computer system comprising:
   a regulation module configured to control a voltage and a frequency that are supplied to each of the plurality of regions; and
   a determination module configured to determine a power mode, which is a combination of the voltage and the frequency that are supplied to each of the plurality of regions, to output an instruction to the regulation module,
   the determination module being configured to determine the power mode of each of the plurality of regions based on a calculation amount of the calculation processing and a communication data amount of the inter-core communication processing in the at least one processor core included in the each of the plurality of regions,
   wherein the plurality of processor cores included in the at least one processor chip are coupled to one another via an intra-chip network, wherein a plurality of processor chips are coupled to one another via an inter-chip network,
wherein each of the plurality of regions is defined based on an attribute of inter-core communication of the plurality of processor cores,
wherein the inter-core communication includes intra-chip communication, which is communication among a plurality of processor cores included in a processor chip, and inter-chip communication, which is communication among a plurality of processor cores included in different processor chips,
wherein the plurality of regions include a first region for carrying out only the intra-chip communication and a second region for carrying out the intra-chip communication and the inter-chip communication, and
the determination module is configured to determine the power mode of each of the first region and the second region so that a difference between a sum of a processing period of the calculation processing with a communication period of the inter-core communication processing of the at least one processor core included in the first region and a sum of a processing period of the calculation processing with a communication period of the inter-core communication processing of the at least one processor core included in the second region decreases.

2. The computer system according to claim 1, wherein:
the determination module is configured to:
receive a program execution request including information indicating a calculation portion of the predetermined program for which the power mode is to be controlled, and the calculation amount and the communication data amount of the at least one processor core included in each of the plurality of regions in the calculation portion; and
determine the power mode of each of the plurality of regions based on the program execution request.

3. The computer system according to claim 1, wherein:
the plurality of processor cores included in the at least one processor chip are coupled to one another via an intra-chip network;
a plurality of processor chips are coupled to one another via an inter-chip network;
each of the plurality of regions is defined based on an attribute of inter-core communication of the plurality of processor cores;
the inter-core communication includes intra-chip communication, which is communication among a plurality of processor cores included in a processor chip, and inter-chip communication, which is communication among a plurality of processor cores included in different processor chips;
the predetermined program includes, for each calculation portion for which the power mode is to be controlled, a command for controlling the power mode of each of the plurality of regions in the each calculation portion; and
the determination module is configured to determine the power mode of each of the plurality of regions based on the command in a case where the predetermined program is executed.

4. The computer system according to claim 1, wherein:
the plurality of processor cores included in the at least one processor chip are coupled to one another via an intra-chip network;
a plurality of processor chips are coupled to one another via an inter-chip network;

each of the plurality of regions is defined based on an attribute of inter-core communication of the plurality of processor cores;
the inter-core communication includes intra-chip communication, which is communication among a plurality of processor cores included in the at least one processor chip, and inter-chip communication, which is communication among a plurality of processor cores included in different processor chips; and
the determination module is configured to:
obtain the calculation amount and the communication data amount from the at least one processor core included in each of the plurality of regions during the execution of the predetermined program; and
determine the power mode of each of the plurality of regions based on the calculation amount and the communication data amount that are obtained from the at least one processor core included in the each of the plurality of regions.

5. The computer system according to claim 1, wherein the determination module is configured to:
determine the power mode of the second region so that the processing period of the calculation processing decreases; and
determine the power mode of the first region so that the processing period of the calculation processing increases.

6. The computer system according to claim 5, wherein the determination module is configured to determine the power mode so that the voltage and the frequency that are supplied to the second region including the at least one processor core increase in descending order of a number of paths for the inter-chip communication that are coupled to the at least one processor core.

7. The computer system according to claim 1, wherein the regulation module is coupled to each of the plurality of regions.

8. The computer system according to claim 1, wherein the each of the plurality of regions is coupled to a power supply configured to supply the voltage to the at least one processor core and a clock generator configured to supply the frequency to the at least one processor core,
wherein the regulation module is coupled to the power supply and the clock generator that are coupled to each of the plurality of regions.

9. A computer, comprising a plurality of processor chips each including a plurality of processor cores,
each of the plurality of processor chips constructing a plurality of regions each constructed by at least one processor core,
each of the plurality of processor cores being configured to carry out calculation processing for executing a predetermined program and inter-core communication processing, which is communication between the processor cores,
the computer comprising:
a regulation module configured to control a voltage and a frequency that are supplied to each of the plurality of regions; and
a determination module configured to determine a power mode, which is a combination of the voltage and the frequency that are supplied to each of the plurality of regions, to output an instruction to the regulation module,
the determination module being configured to determine the power mode of each of the plurality of regions based on a calculation amount of the calculation processing and a communication data amount of the inter-core communication processing in the at least one processor core included in the each of the plurality of regions, wherein the plurality of processor cores included in each of the plurality of processor chips are coupled to one another via an intra-chip network, wherein the plurality of processor chips are coupled to one another via an inter-chip network, wherein each of the plurality of regions is defined based on an attribute of inter-core communication of the plurality of processor cores, wherein the inter-core communication includes intra-chip communication, which is communication among a plurality of processor cores included in a processor chip, and inter-chip communication, which is communication among a plurality of processor cores included in different processor chips, wherein the plurality of regions include a first region for carrying out only the intra-chip communication and a second region for carrying out the intra-chip communication and the inter-chip communication, and wherein the determination module is configured to determine the power mode of each of the first region and the second region so that a difference between a sum of a processing period of the calculation processing with a communication period of the inter-core communication processing of the at least one processor core included in the first region and a sum of a processing period of the calculation processing with a communication period of the inter-core communication processing of the at least one processor core included in the second region decreases.

10. The computer according to claim 9, wherein:

the predetermined program includes, for each calculation portion for which the power mode is to be controlled, a command for controlling the power mode of each of the plurality of regions in the each calculation portion; and the determination module is configured to determine the power mode of each of the plurality of regions based on the command in a case where the predetermined program is executed.

11. The computer according to claim 9, wherein:

the plurality of processor cores included in each of the plurality of processor chips are coupled to one another via an intra-chip network;

the plurality of processor chips are coupled to one another via an inter-chip network;

each of the plurality of regions is defined based on an attribute of inter-core communication of the plurality of processor cores;

the inter-core communication includes intra-chip communication, which is communication among a plurality of processor cores included in a processor chip, and inter-chip communication, which is communication among a plurality of processor cores included in different processor chips; and the determination module is configured to:

obtain the calculation amount and the communication data amount from the at least one processor core included in each of the plurality of regions during the execution of the predetermined program; and determine the power mode of each of the plurality of regions based on the calculation amount and the communication data amount that are obtained from the at least one processor core included in the each of the plurality of regions.

12. The computer according to claim 9, wherein the determination module is configured to determine the power mode so that the voltage and the frequency that are supplied to the second region including the at least one processor core increase in descending order of a number of paths for the inter-chip communication that are coupled to the at least one processor core.

13. The computer according to claim 12, wherein the each of the plurality of regions is coupled to a power supply configured to supply the voltage to the at least one processor core and a clock generator configured to supply the frequency to the at least one processor core, wherein the regulation module is coupled to the power supply and the clock generator that are coupled to each of the plurality of regions.

* * * * *